United States Patent
Lipari et al.

(10) Patent No.: US 9,726,085 B2
(45) Date of Patent: Aug. 8, 2017

(54) METHOD FOR CONTROLLING A GAS TURBINE GROUP

(71) Applicant: ALSTOM Technology Ltd, Baden (CH)

(72) Inventors: Sebastian Lipari, Neuenhof (CH); Ghislain Singla, Bern (CH); Thiemo Meeuwissen, Ennetbaden (CH); Theodoros Ferreira-Providakis, Wettingen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 558 days.

(21) Appl. No.: 14/445,627

(22) Filed: Jul. 29, 2014

(65) Prior Publication Data
US 2015/0052904 A1 Feb. 26, 2015

(30) Foreign Application Priority Data
Aug. 20, 2013 (EP) .................................. 13181045

(51) Int. Cl.
F02C 6/00 (2006.01)
F02C 9/28 (2006.01)
F02C 9/34 (2006.01)

(52) U.S. Cl.
CPC ................ F02C 9/28 (2013.01); F02C 6/003 (2013.01); F02C 9/34 (2013.01); F05D 2270/14 (2013.01);
(Continued)

(58) Field of Classification Search
CPC .... F02C 6/003; F02C 9/26; F02C 9/28; F02C 9/34; F23R 2900/03341; F05D 2270/14; F05D 2270/303; F05D 2270/309
See application file for complete search history.

(56) References Cited

U.S. PATENT DOCUMENTS 3,688,495 A * 9/1972 Fehler ...................... F02C 9/32
60/39.281
3,729,929 A * 5/1973 Kiscaden .................. F02C 7/26
60/39.281

(Continued)

FOREIGN PATENT DOCUMENTS

CN 1410712 A 4/2003
CN 1703574 A 11/2005
(Continued)

OTHER PUBLICATIONS

Chinese Office Action for Application No. 201410411080X dated Febraury 28, 2017.

(Continued)

Primary Examiner — William H Rodriguez
(74) Attorney, Agent, or Firm — Buchanan Ingersoll & Rooney PC

(57) ABSTRACT

The invention relates to a method for controlling a gas turbine group including, a first combustion chamber, a first turbine connected, a second combustion chamber, a second turbine, and a load. The method includes: measuring a temperature TAT1 at an outlet of the first turbine; determining a ratio S1R of a fuel mass flow feeding a pilot flame of the first combustion chamber to a total fuel mass flow feeding the first combustion chamber based upon the measured temperature TAT1 in accordance with a predetermined mapping table between ratio S1R and temperature TAT1; adopting the larger one between the determined ratio S1R and a predetermined booster ratio S1R to be used in the controlling fuel flow feeding the first combustion chamber of the gas turbine group. Pulsation behavior of the gas turbine group may be improved. High pulsation during fast de-loading of the gas turbine group is substantially is (Continued)

decreased, avoiding potential damage to the parts of the gas turbine group.

6 Claims, 3 Drawing Sheets

(52) U.S. Cl.
 CPC .. *F05D 2270/303* (2013.01); *F05D 2270/309* (2013.01)

(56) References Cited

U.S. PATENT DOCUMENTS

| | | | | |
|---|---|---|---|---|
| 4,045,955 | A * | 9/1977 | Brannstrom | F02C 9/32 60/39.281 |
| 5,212,943 | A * | 5/1993 | Harris | F02C 9/28 60/39.281 |
| 5,481,865 | A | 1/1996 | Frutschi | |
| 5,584,171 | A | 12/1996 | Sato et al. | |
| 5,622,042 | A * | 4/1997 | Mirsky | F02C 9/00 60/39.281 |
| 5,634,327 | A | 6/1997 | Kamber et al. | |
| 6,202,399 | B1 * | 3/2001 | Frutschi | F02C 6/003 60/39.17 |
| 6,338,240 | B1 * | 1/2002 | Endo | F02C 9/34 60/39.27 |
| 6,408,611 | B1 * | 6/2002 | Keller | F02C 9/28 60/39.281 |
| 9,121,608 | B2 * | 9/2015 | Elkady | F02C 3/14 |
| 9,249,738 | B2 * | 2/2016 | Nemet | F02C 9/28 |
| 2004/0055273 | A1 * | 3/2004 | Hirayama | F02C 9/28 60/39.281 |
| 2006/0005526 | A1 * | 1/2006 | Tanaka | F02C 7/228 60/39.27 |
| 2006/0218930 | A1 * | 10/2006 | Nuding | F02C 7/1435 60/775 |
| 2007/0051109 | A1 * | 3/2007 | Sonoda | F02C 9/28 60/773 |
| 2012/0279230 | A1 * | 11/2012 | Botarelli | F02C 9/00 60/773 |
| 2015/0185716 | A1 * | 7/2015 | Wichmann | F01K 23/101 700/287 |
| 2015/0354466 | A1 * | 12/2015 | Higashi | F02C 9/28 60/776 |

FOREIGN PATENT DOCUMENTS

| | | |
|---|---|---|
| CN | 101368514 A | 2/2009 |
| CN | 101779020 A | 7/2010 |
| EP | 2 025 902 A2 | 2/2009 |
| EP | 2 184 467 A1 | 5/2010 |

OTHER PUBLICATIONS

Chinese Office Action for Application No. 201410411080X dated Feb. 28, 2017 (English Translation).

* cited by examiner

METHOD FOR CONTROLLING A GAS TURBINE GROUP

CROSS-REFERENCE TO RELATED APPLICATIONS

This application claims priority to European application 13181045.9 filed Aug. 20, 2013, the contents of which are hereby incorporated in its entirety.

TECHNICAL FIELD

The present invention relates to gas turbine group with sequential combustion, in particular, to a method for controlling a gas turbine group.

BACKGROUND

In a gas-turbine group having sequential combustion consisting of two combustion chambers, when reduced power is required, it is known to effect the part load of gas turbine groups by means of a fuel control system and/or inlet guided vane. In such a gas-turbine group, the output could certainly be lowered by closing the inlet guide vane of the compressor. In addition, power reduction may be adjusted by controlling fuel mass flow feeding the gas turbine group.

In certain cases, when a reason for causing malfunction of the gas turbine group occurs or when a sudden reduction of load is requested, the gas turbine group must be de-loaded as fast as possible in order to avoid any damage. At the same time, it should be noted to take care of reducing the thermal stresses through hot gas path. Generally, fast de-loading, i.e. de-loading gradient faster than regular load gradient during normal operation of the gas turbine group may induce high pulsation in the gas turbine group that potentially cause damage to the combustion chambers.

A method of operating a gas turbine group having sequential combustion is disclosed in U.S. Pat. No. 5,634,327, wherein action is taken first of all on the inlet temperatures at the two turbines in order to provide a partial-load operation. The subsequent lowering of the load takes place by adjustment of the compressor guide blades, that is, by reducing the mass flow to below 50% of the rated load. During this lowering, the inlet temperature at the first turbine is kept constant, while the other inlet temperature at the second turbine is continuously lowered; the outlet temperature of the second turbine is in contrast kept constant. After the lowering of the load is complete by adjusting the compressor guide blades, the inlet temperatures are reduced directly or in a phase-displaced manner.

A method for regulating a gas-turbine assembly is disclosed in U.S. Pat. No. 5,481,865A, in which the gas turbine assembly essentially consists of a compressor unit , of an HP-combustion chamber , of an HP-turbine, of an LP-combustion chamber, of an LP-turbine and of a generator, the rating of the fuel quantity for the HP-combustion chamber is carried out responsive to a corrected temperature signal which is formed by the value of the temperature at the outlet of the LP-turbine, reduced by the particular temperature rise detectable there. This temperature signal is recorded in that the temperature rise generated by the fuel quantity introduced into the LP-combustion chamber is subtracted from the measured temperature at the outlet of the LP-turbine. The uncorrected temperature signal at the outlet of the LP-turbine is used for rating the fuel quantity for the LP-combustion chamber.

A gas turbine engine control method and apparatus is disclosed in U.S. Pat. No. 5,584,171, which is used for optimizing fuel/air mixture, especially during decreasing load conditions. In a large capacity gas turbine engine system used for generation of electric power, the system is designed to operate at a relatively constant rotational speed of the turbine which drives an electric generator unit. The load of the turbine engine varies throughout the day due to changes in electrical power demands. During normal rated load conditions, the control of the fuel/air mixture is by way of changes in fuel supply, corrected to return the turbine exhaust temperature to a desired rated temperature. During this mode of operation, the compressor inlet guide vanes are maintained in a substantially constant open position. For accommodating decreasing load conditions where the temperature drops below a predetermined temperature level below the rated temperature operation, the system is switched to an inlet guide vane control mode of operation. During the guide vane control mode of operation, the inlet guide vanes are controlled at a more precise temperature correction sensitivity than is the case for normal load operations. This more precise inlet guide vane control during decreasing load conditions assures improved fuel/air mixture during decreasing load and consequent improved efficiency and minimal NOx compound emissions, especially during changing ambient temperature conditions where cold air would otherwise increase the air supply.

Even relevant patent documents are referenced as above, there exists the need for a solution to address, or at least mitigate, the high pulsations accompanying fast de-loading of the gas turbine group.

SUMMARY

An object of the present invention is to provide a method for controlling a gas turbine group comprising, in a flow direction of a working fluid, a first combustion chamber, a first turbine connected downstream of the first combustion chamber, a second combustion chamber connected downstream of the first turbine which operates by autoignition, a second turbine connected downstream of the second combustion chamber, and a load connected to be driven by the first and second turbines, the method comprising steps of: measuring a temperature TAT1 at an outlet of the first turbine; determining a ratio S1R of a fuel mass flow feeding a pilot of the first combustion chamber to a total fuel mass flow feeding the first combustion chamber based upon the measured temperature TAT1 in accordance with a predetermined mapping table between ratio S1R and temperature TAT1; adopting the larger one between the determined ratio S1R and a predetermined booster ratio S1R to be used in the controlling fuel flow feeding the first combustion chamber of the gas turbine group.

According to one possible embodiment of the present invention, the method further comprises steps of: measuring a de-loading gradient of the load when the load is decreasing; determining that the measured de-loading gradient is greater than a predetermined de-loading gradient by which the load is subject to a regular de-loading process.

According to one possible embodiment of the present invention, the predetermined mapping table is determined in a commissioning procedure, wherein the commissioning procedure comprises steps of: determining a first pulsation frequency and a second pulsation frequency larger than the first pulsation frequency at a given inlet guided vane in the gas turbine; measuring a discrete temperature TAT1 according to the discretely varying ratio S1R when the first or second pulsation frequency is observed in the gas turbine during a commissioning procedure of the gas turbine, where the ratio S1R corresponding the maximum of the temperature TAT1 is determined as the nose ratio S1R; storing the temperature TAT1 and corresponding ratio S1R as the mapping table for subsequent use.

According to one possible embodiment of the present invention, the predetermined booster ratio S1R equals to 1.1 to 1.5 times of the nose ratio S1R.

According to one possible embodiment of the present invention, the predetermined booster ratio S1R equals to 1.2 to 1.4 times of the nose ratio S1R.

According to one possible embodiment of the present invention, the predetermined booster ratio S1R equals to 1.3 times of the nose ratio S1R.

With the technical solutions proposed according to example embodiments of the present invention, pulsation behavior of the gas turbine group may be improved and high pulsation during fast de-loading of the gas turbine group is substantially decreased, avoiding potential damage to the parts of the gas turbine group.

BRIEF DESCRIPTION OF THE DRAWINGS

The objects, advantages and other features of the present invention will become more apparent upon reading of the following non-restrictive description of preferred embodiments thereof, given for the purpose of exemplification only, with reference to the accompany drawing, through which similar reference numerals may be used to refer to similar elements, and in which.

DETAILED DESCRIPTION

Figure 1:
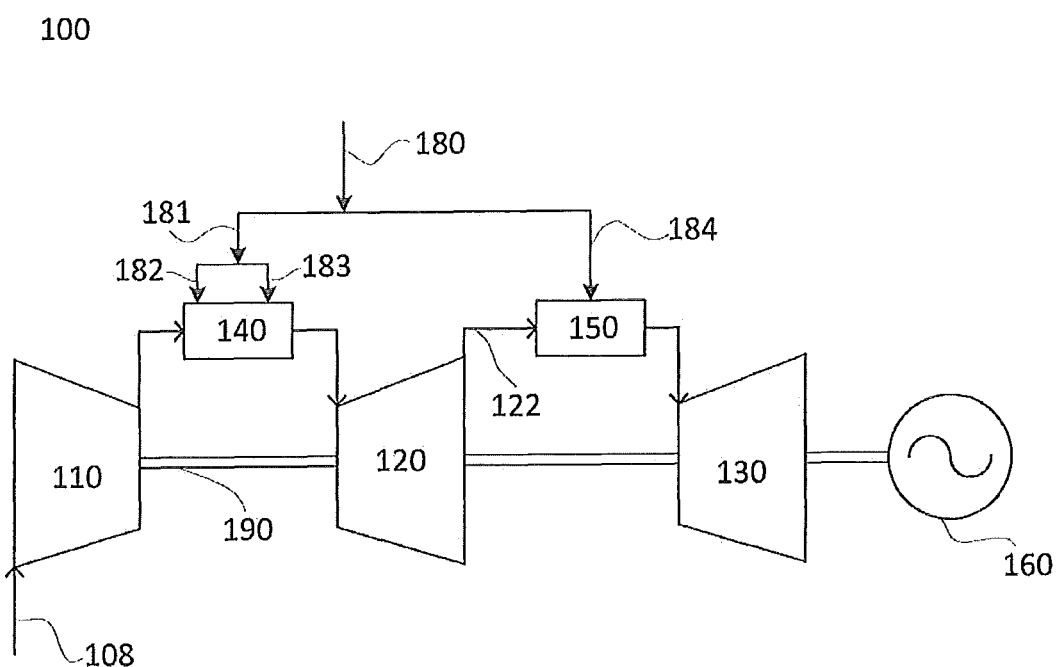
FIG. 1 shows a schematic diagram of a gas turbine group.

FIG. 1 illustrates a schematic, simplified diagram of a gas turbine group 100 with sequential combustion which is known per se. The gas turbine group 100 comprises a compressor unit 110 in which the compression of the induced air 108 takes place. The compressed air then flows into a first combustion chamber (high-pressure combustion chamber) 140, in which the first generation of hot gas takes place by means of a fuel mass flow 181 that is part of the total fuel mass flow 180. A first turbine (high-pressure turbine) 120 operates downstream of the first combustion chamber 140 and the hot gases experience a partial expansion in the first turbine 120. This partial expansion has the feature that the exhaust gases from the first turbine 120 still have a relatively high temperature of the order of value of 1000° C. or more. The temperature at the outlet of the first turbine 120, which is termed as TAT1, may be measured in the hot gas path 122 by means of known method per se to those skilled in the art. A second combustion chamber (low-pressure combustion chamber) 150 acts downstream of the first turbine 120 and this second combustion chamber 150 functions on a self-ignition principle with a fuel mass flow 184 feeding therein, which is part of the total fuel mass flow 180. The hot gas generated in the second combustion chamber 150 is experienced further expansion in a second turbine 130 (low-pressure turbine) connected downstream of the second combustion chamber 150. Generally, the gas turbine group 100 drives a load, such as a generator, by the first and second turbine 120, 130. As one example for illustration, a generator 160 as one example of the load is connected downstream of the second turbine 130, which is ,for example, disposed on a shaft 190 with the first and second turbine 120, 130, and driven by the first turbine 120 and the second turbine 130. It should be noted by those skilled in the art, the generator as shown in FIG. 1 is only an example to explain the principles of the present invention, and the load of the gas turbine group may vary in accordance with different applications, and the load is not always directly connected to the shaft of the gas turbine group, such as in multi-shaft configurations, and the load is not necessarily disposed downstream of the low pressure turbine, such as the load may be disposed upstream of the high pressure turbine.

As the load of the generator 160 is decreased, fuel mass flow control and inlet guide vane control are introduced to influence the control of the gas turbine group 100. Generally, the fuel mass flow 181 feeding the first combustion chamber 140 may divided into two portions, a first portion 182 feeding the pilot flame of the first combustion chamber 140, and a second portion 183 feeding the premixed flame of the first combustion chamber. In the present invention, a ratio S1R of the fuel mass flow 182 feeding the pilot flame of the first combustion chamber 140 to a total fuel mass flow 181 feeding the first combustion chamber 140 is introduced into the control of the gas turbine group 100. According to findings of the present inventor, the higher the ratio S1R the higher is the fuel mass flow that is combusted in the so-called "pilot flame". High ratio S1R allows a more stable flame but at the same time high NOx emission. On the other hand, low ratio S1R allows low NOx emissions but lead to a less stable flame, i.e. higher pulsation levels.

As used herein, the temperature TAT1 at the outlet of the first turbine 120 is measured to indicate the load status of the generator 160. Generally, the ratio S1R will be mapped to correspond with the measured temperature TAT1 during commissioning of the gas turbine group 100, by which a map table is generated and stored for later use, such as used in controlling the gas turbine group 100 when the generator 160 is de-loading.

Generally, one common control during de-loading of the gas turbine group 100 may be achieved by adjustment of the inlet guided vane. Fuel mass flow control can be adopted together with adjustment of inlet guided vane before the inlet guided vane is disposed to the idle position. It is common approach that the inlet guided vane is adjusted firstly until it reach the idle position. After that, fuel mass flow control will contribute to the de-loading process. It should be noted that the method as proposed according to embodiments of the present invention not only apply to the application where fuel mass flow and the inlet guided vane are both adjusted, but also apply to the application where the inlet guided vane is disposed to the idle position and fuel mass flow control is adopted.

When fast de-loading is required, no matter that causes from malfunction or specific control application, the ratio S1R determined according to the map table in response to the measured temperature TAT1 will deviate from the expected value due to measurement delay introduced into the measurement of the temperature TAT1 by various factors, such as response delay of the sensors used to measure the temperature TAT1. Generally, the determined ratio S1R according to an apparent high temperature TAT1 due to measurement delay is less than the regular ratio S1R that is determined according to the actual temperature TAT1, which is relatively lower due to fast de-loading, as the gas turbine group 100 is de-loading regularly. Such deviation may result high pulsation in the gas turbine group 100 in certain region during the fast de-loading process of the gas turbine group 100, after which the harmful high pulsation may diminished with increasing of the ratio S1R.

In view of this circumstance, a method for controlling the gas turbine group 100 is proposed in order to eliminate this drawback, wherein the method comprises steps of measuring a temperature TAT1 at an outlet of the first turbine 120; determining a ratio S1R of a fuel mass flow 182 feeding the pilot flame of the first combustion chamber 140 to a total mass flow 181 feeding the first combustion chamber 140 based upon the measured temperature TAT1 in accordance with a predetermined mapping table between ratio S1R and temperature TAT1; adopting the larger one between the determined ratio S1R and a predetermined booster ratio S1R to be used in controlling fuel mass flow 180 feeding the gas turbine group 100. According to one example embodiment, the ratio S1R where the harmful high pulsation diminished may be selected as the pre-determined booster ratio S1R.

According to one example embodiment of the present invention, de-loading gradient may be measured to distinguish a circumstance that the method according to the above embodiment of the present invention should be adopted. To this end, the method further comprises, before the adopting step, steps of:

measuring a de-loading gradient of the generator 160 when a load of the generator 160 is decreasing; determining that the measured de-loading gradient is greater than a predetermined de-loading gradient by which the generator is subject to a regular de-loading process. As it is known to those skilled in the art, normal de-loading gradient is close to 16 MW/min for a typical gas turbine group.

According to one example embodiment, the predetermined de-loading gradient may be 16 MW/min, for example. It may be regarded as fast de-loading when the de-loading gradient is more or less than double of the normal gradient, i.e. 32 MW/min. It should be noted that, as used herein, the term "regular de-loading process" refers to process in which the gas turbine group is normally shut down, which is commonly understood by those skilled in the art.

According to another aspect of the present invention, a commissioning procedure is proposed in order to improve the efficiency of the method as described in embodiments of the present invention. The commissioning procedure will be detailed with reference to FIG. 2.

As is known to those skilled in the art, two types of pulsations, i.e. lean blow-off (LBO) pulsation and cold tone pulsation, contribute much to negative impact to combustion stability in the so called "nose region", where the LBO flame off pulsation substantially occurs in a frequency range of 10 Hz to 30 Hz, while the cold tone pulsation substantially occurs in a frequency range of 100 Hz to 130 Hz. It should be noted that the present invention does not mean that the combustion pulsation consists of the above two types of pulsation only.

During the commissioning procedure according to embodiments of the present invention, the LBO flame off pulsation and cold tone pulsation are determined at given inlet guided vane in the gas turbine group 100, such as the idle position of the inlet guided vane.

Figure 2:
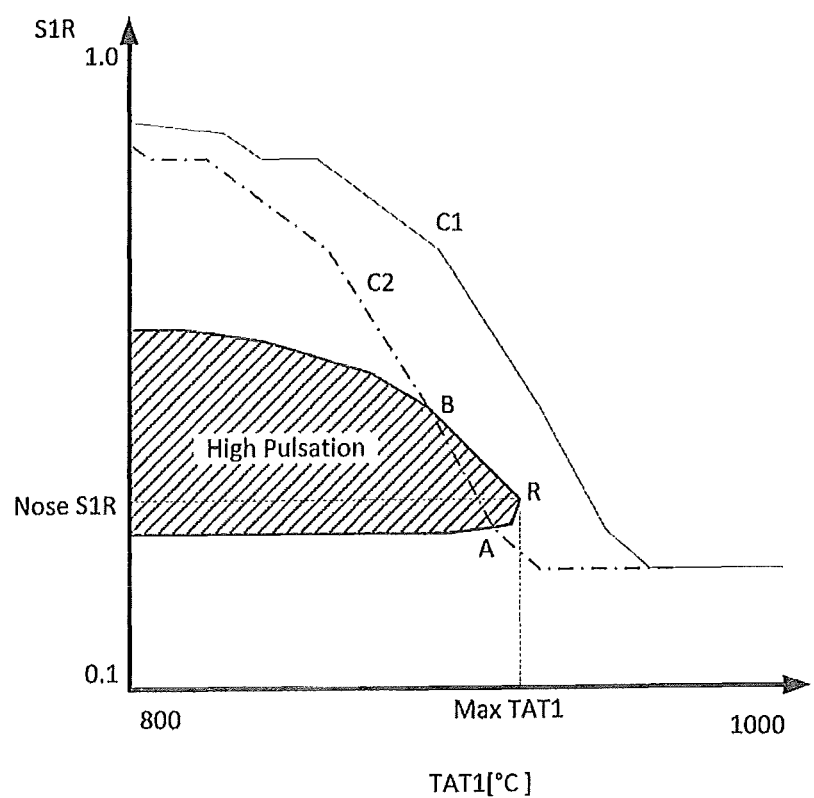
FIG. 2 shows a graphic view of the ratio S1R versus temperature TAT1 during normal de-loading process and fast de-loading process without the method according to the present invention, and a high pulsation area obtained by the commissioning procedure according to embodiment procedure of the present invention.

Then, when the gas turbine group is loading and de-loading, a high pulsation area as shown in FIG. 2 by the hatched area, the so called "nose region", is generated in the coordinate system space defined by the ratio S1R and the temperature TAT1. In particular, measuring a discrete temperature TAT1 according to the discretely varying ratio S1R when the LBO flame off or cold tone pulsation frequency is observed in the gas turbine group 100 during the commissioning procedure of the gas turbine, where the ratio S1R corresponding to the maximum of the temperature TAT1 is determined as the nose ratio S1R; storing the temperature TAT1 and corresponding ratio S1R as the mapping table for subsequent use.

It is readily understood that values of the ratio S1R and the temperature TAT1 falling in the high pulsation area will induce high pulsation that may potentially result severe damage to the gas turbine group which should be prevented during normal operation of the gas turbine group. As discrete point utilized by the ratio S1R and the temperature TAT1, those skilled in the art will know details on how to delimitate the high pulsation area, including the step used to increase/decrease the ratio S1R, the measurement of the temperature TAT1, and observation of the pulsation in the gas turbine group 100.

As shown by FIG. 2, it is defined that, in connection with the high pulsation area, the ratio S1R corresponding to the maximum of the temperature TAT1 as shown by Max TAT1 in FIG. 1 is determined as the nose ratio S1R as shown by Nose S1R in FIG. 2. In other words, the point R(Max TAT1, Nose S1R) on the coordinate system defined by the temperature TAT1 and the ratio S1R represent the nose point.

According to embodiments of the present invention, the pairs of value of the TAT1 and the ratio S1R coming from the commissioning procedure that delimitate the High Pulsation area may be stored as mapping table for subsequent use.

As above mentioned and as shown in FIG. 2, the curve C1 represents the normal operation of the gas turbine group, from which we may find that curve C1 does not intersect the High Pulsation area, thereby the operation following curve C1 will not induce high pulsation in the gas turbine group 100. In contrast, the curve C2 in FIG. 2 represents the typical fast de-loading process without involvement of the present invention as mentioned above, from which we may find that curve C2 intersect the high pulsation area at points A and B due to the temperature detection delay, thereby severe pulsation that potentially damage the gas turbine group occurs.

With the commissioning procedure proposed according to embodiments of the present invention, it may help to specifically define the range for the booster ratio S1R adopted in the method according to embodiments of the present invention in order to improve control efficiency and response reliability. For example, the booster ratio S1R may equal to 1.1 to 1.5 times of the nose ratio S1R, or may equal to 1.2 to 1.4 times of the nose ratio S1R, or more particularly, may equal to 1.3 times of the nose ratio S1R.

Figure 3:
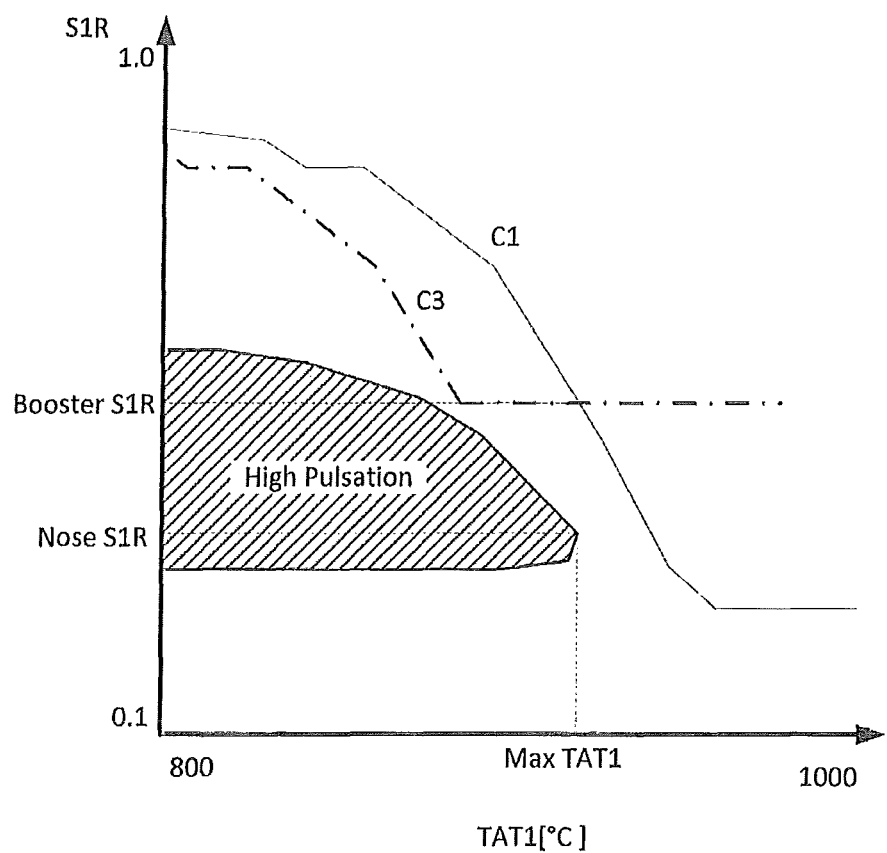
FIG. 3 shows a graphic view of the ratio S1R versus temperature TAT1 in a method according to one embodiment of the present invention during fast de-loading process.

As shown in FIG. 3, the curve C3, which corresponds to the de-loading process as shown in FIG. 2 by curve C2, may represent the method implemented according to one example embodiment of the present invention, in which case the method comprises: measuring a de-loading gradient of the generator 160 when a load of the generator 160 is decreasing; determining that the measured de-loading gradient is greater than a predetermined de-loading gradient by which the generator 160 is subject to a regular de-loading process; measuring a temperature TAT1 at an outlet of the first turbine 120; determining a ratio S1R of a fuel mass flow 182 feeding the pilot flame of the first combustion chamber 140 to a total mass flow 181 feeding the first combustion chamber 140 based upon the measured temperature TAT1 in accordance with a mapping table between ratio S1R and temperature TAT1 obtained in the above mentioned commissioning procedure; adopting the larger one between the determined ratio S1R and 1.3 times of the nose ratio S1R obtained in the above mentioned commissioning procedure to be used in controlling fuel mass flow 181 feeding the first combustion chamber 140 of the gas turbine group 100.

It should be noted that the above mentioned method may represent one possible implementation according to embodiments of the present invention. Many other implementations will be possible under teaching of the present invention. For example, the adopting step in the above mentioned method, the larger one of the ratio S1R may be the larger one between the determined ratio S1R and 1.2, 1.4 or 1.5 times of the nose ratio S1R obtained the above mentioned commissioning procedure. It may be found that the potential intervening region shown in FIG. 2 by the section between points A and B is prevented from occurring during a fast de-loading process, thereby protecting the gas turbine group from any potential damage caused by high pulsations.

With the technical solutions proposed according to example embodiments of the present invention, pulsation behavior of the gas turbine group may be improved and high pulsation during fast de-loading of the gas turbine group is substantially decreased, avoiding potential damage to the parts of the gas turbine group. Many other technical advantages may be apparent to those skills in the art when reading the description.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for controlling a gas turbine group comprising, in a flow direction of a working fluid, a first combustion chamber, a first turbine connected downstream of the first combustion chamber, a second combustion chamber connected downstream of the first turbine which operates by autoignition, a second turbine connected downstream of the second combustion chamber, and a load connected to be driven by the first and second turbines, the method comprising:
   measuring a temperature TAT1 at an outlet of the first turbine;
   determining a ratio S1R of a fuel mass flow feeding a pilot flame of the first combustion chamber to a total fuel mass flow feeding the first combustion chamber based upon the measured temperature TAT1 in accordance with a predetermined mapping table between ratio SIR and temperature TAT1;
   adopting the larger one between the determined ratio S1R and a predetermined booster ratio S1R to be used in the controlling fuel mass flow feeding the first combustion chamber of the gas turbine group.

2. The method according to claim 1, further comprising:
   measuring a de-loading gradient of the load when the load is decreasing;
   determining that the measured de-loading gradient is greater than a predetermined de-loading gradient by which the load is subject to a regular de-loading process.

3. The method according to claim 1, wherein the predetermined mapping table are determined in a commissioning procedure, wherein the commissioning procedure comprises:
   determining a first pulsation frequency and a second pulsation frequency larger than the first pulsation frequency at a given inlet guided vane in the gas turbine group;
   measuring a discrete temperature TAT1 according to the discretely varying ratio S1R when the first or second pulsation frequency is observed in the gas turbine during the commissioning procedure of the gas turbine, where the ratio S1R corresponding to the maximum of the temperature TAT1 is determined as the nose ratio S1R;
   storing the temperature TAT1 and corresponding ratio S1R as the mapping table for subsequent use.

4. The method according to claim 1, wherein the predetermined booster ratio S1R equals to 1.1 to 1.5 times of the nose ratio S1R.

5. The method according to claim 1, wherein the predetermined booster ratio S1R equals to 1.2 to 1.4 times of the nose ratio S1R.

6. The method according to claim 1, wherein the predetermined booster ratio S1R equals to 1.3 times of the nose ratio S1R.

* * * * *